Patented Nov. 21, 1933

1,935,945

UNITED STATES PATENT OFFICE 1,935,945

VAT DYESTUFFS AND PROCESS OF PREPARING THEM

Wilhelm Eckert and Otto Braunsdorf, Frankfort-on-the-Main, Germany, assignors to General Aniline Works, Inc., New York, N. Y., a corporation of Delaware No Drawing. Application December 5, 1930, Serial No. 500,422, and in Germany December 17, 1929

9 Claims. (Cl. 260—44)

This invention relates to vat dyestuffs and a process of preparing them.

We have found that new valuable vat dyestuffs are obtainable by condensing naphthoylene-aryl-imidazol-peri-dicarboxylic acid or a derivative of this compound of the following general formula:

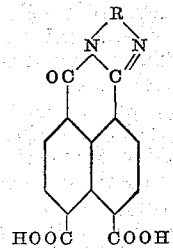

wherein R represents an arylene group, bound in two adjacent positions, which may be substituted with a compound of the general formula: X—NH$_2$ wherein X represents hydrogen or an alkyl-, aryl-, aralkyl- or hydrogenated aryl group or an amino group which may be substituted by a phenyl group.

Instead of the peri-dicarboxylic acids mentioned there may be used with the same effect the corresponding dicarboxylic acid anhydride. Both processes are to be regarded as equivalent and they are both enclosed in the present invention and in the claims.

The vat dyestuffs thus obtainable correspond with the following general formula:

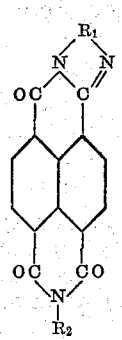

wherein R$_1$ stands for an arylene group, bound in two adjacent positions, which may be substituted, R$_2$ stands for hydrogen, an alkyl-, aryl-, aralkyl- or a hydrogenated aryl-group or an amino group which may be substituted by a phenyl group and wherein the naphthalene nucleus may be substituted, for instance, by halogen. It is a surprising fact that the new derivatives are useful vat dyestuffs since the 1.4.5.8-naphthalene-tetra-carboxylic acid-di-alkyl-or arylimides of the following formula:

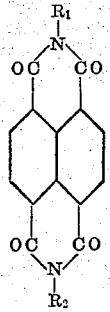

are nearly colorless.

The new dyestuffs are distinguished by their clear tints, great dyeing power and good fastness properties.

The same dyestuffs may be obtained by condensing a naphthalene-tetra-carboxylic acid derivative of one of the general formulæ:

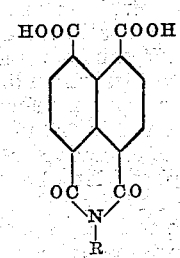

or

HOOC    COOH wherein R stands for hydrogen, an alkyl-, aryl-, aralkyl- or a hydrogenated aryl-group or a substituted or unsubstituted amino group such, for instance, as hydrazine, with an ortho-diamine or a salt thereof in the absence or in the presence of a solvent or a diluent.

The same dyestuffs are likewise obtained by condensing the above mentioned parent material with an ortho-nitro-amino compound and treating the condensation products which correspond with the following formula:

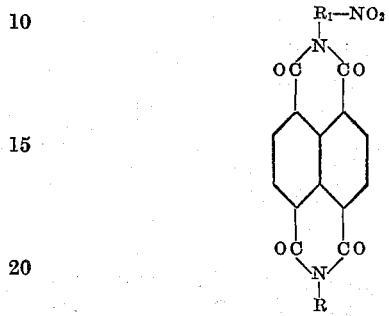

with a reducing agent whereby simultaneously ring closure takes place.

The following examples serve to illustrate the invention but they are not intended to limit it thereto, the parts being by weight unless stated otherwise:

(1) 10 parts of naphthoylene-benzimidazol-peri-dicarboxylic acid anhydride are heated to gentle boiling with 10 times their weight of aniline. The anhydride thereby dissolves at first and then the formation of the anilide of the naphthoylene - benzimidazol-peri - dicarboxylic acid of the following formula:

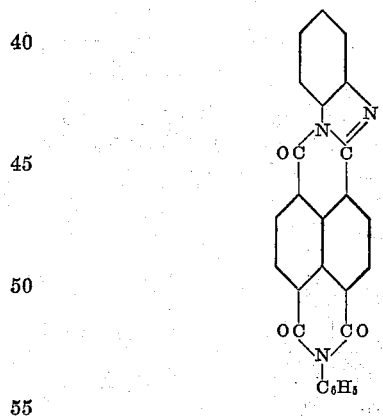

sets in with elimination of water. After heating for some hours, the solution is diluted with ethyl alcohol, filtered with suction and the solid matter is washed first with alcohol and then with dilute sodium carbonate solution and finally with water. The dyestuff thus obtained is a microcrystalline yellow powder which dissolves in concentrated sulfuric acid to a yellow solution. It dyes cotton from a red hydrosulfite vat reddish yellow tints of good fastness to chlorine.

(2) 1 part of naphthoylene-benzimidazol-peri-dicarboxylic acid or of the anhydride thereof is heated with 2 parts of beta-naphthylamine in 20 parts of trichlorobenzene to temperatures in the neighborhood of 200° C. until any unacted upon parent material can no longer be detected. After cooling, the solution is filtered with suction, the solid matter is freed from an excess of beta-naphthylamine and the solvent by means of alcohol. The condensation product of the following formula:

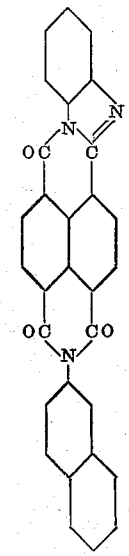

is obtained in the form of a yellow powder which dissolves in concentrated sulfuric acid to a yellow solution and dyes cotton from a red alkaline hydrosulfite vat yellow tints.

(3) 1.7 parts of naphthoylene-benzimidazol-peri-dicarboxylic acid anhydride are introduced into 10 parts of molten para-chloraniline and the melt is heated for several hours to about 180° C.–200° C. while stirring. After cooling, the crystalline reaction product which has been formed, i. e. the parachloranilide of naphthoylene-benzimidazol-peri-dicarboxylic acid of the formula:

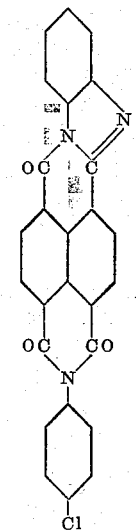

is separated from the excess of para-chloraniline by treating the solidified melt with a suitable solvent such, for instance, as alcohol. The dyestuff is obtained in the form of reddish prismatic small crystals which, when heated to 370° C., remain entirely unchanged. It dissolves in sulfuric acid to a yellow solution. From a red hydrosulfite vat it dyes cotton yellow tints.

(4) 3.4 parts of naphthoylene-benzimidazol-peri-dicarboxylic acid or of the anhydride thereof are heated with 15 parts of para-xylidine to about 200° C. for about 5 hours. The melt is worked up as described in the preceding examples and yields a dyestuff which corresponds with the probable formula:

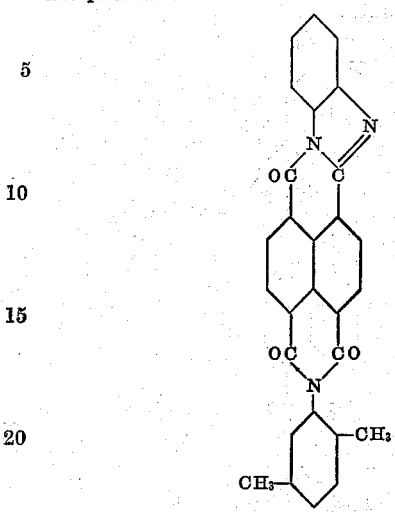

It is obtained in the form of microcrystalline felted yellow small needles; it dissolves in concentrated sulfuric acid to a yellow solution and dyes cotton from a red hydrosulfite vat yellow tints.

(5) By using in Example 4 instead of para-xylidine the corresponding quantity of asymmetrical meta-xylidine, there is obtained a very similar yellow dyestuff having properties similar to those of the isomerides.

(6) 1.5 parts of naphthoylene-benzimidazol-peri-dicarboxylic acid anhydride are heated with 8–10 parts of ortho-toluidine near to the boiling point of the base. In order to promote the condensation a small quantity of dehydrated sodium acetate may be added. When any unchanged parent material can no longer be detected, the solution is filtered with suction, the solid matter is washed with alcohol and water. The dry condensation product, probably the ortho-toluidide of naphthoylene-benzimidazol-peri-dicarboxylic acid which corresponds with the following probable formula:

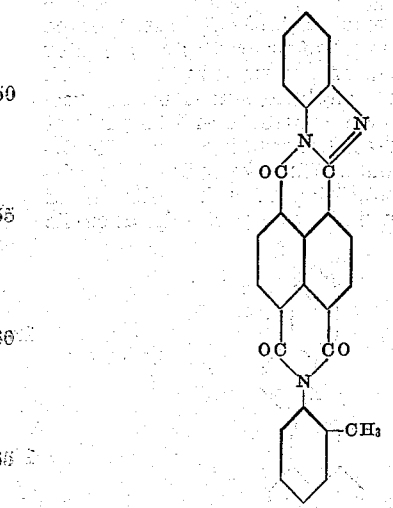

is a brownish yellow amorphous powder. It dissolves in concentrated sulfuric acid to a yellow solution and dyes cotton from a red vat yellowish tints.

(7) 3.4 parts of naphthoylene-benzimidazol-peri-dicarboxylic acid anhydride are heated to boiling for some hours under reflux with 5–6 times their weight of cyclohexylamine or a larger excess of an aqueous solution of cyclohexylamine of about 50% strength. The whole is then diluted with water and the dyestuff which has separated in small orange crystalline needles is filtered with suction, washed with water and dried. The condensation product which may be supposed to correspond with the formula of the cyclohexylimide of the naphthoylene-benzimidazol-peri-dicarboxylic acid

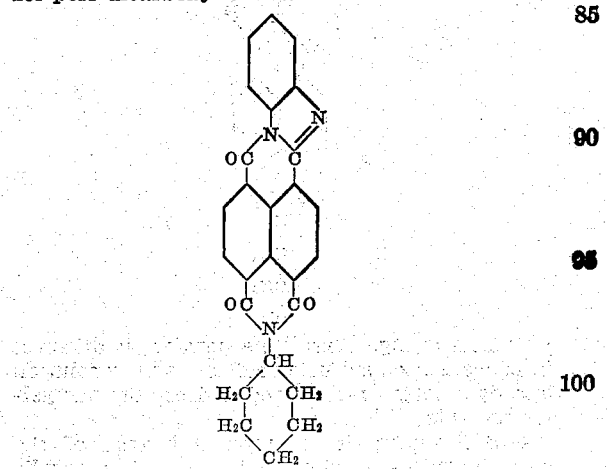

dissolves in concentrated sulfuric acid to a yellow solution and dyes cotton from a dark red alkaline hydrosulfite vat clear reddish yellow tints of good fastness properties.

(8) 1.75 parts of naphthoylene-methyl-benzimidazol-peri-dicarboxylic acid anhydride are introduced into 6 parts of molten para-toluidine and the melt is heated for some time near to the boiling point of the para-toluidine. When the cold melt is worked up with alcohol and water the condensation product is obtained in the form of an orange residue. It dissolves in concentrated sulfuric acid to a reddish yellow solution. It dyes cotton from a dark red alkaline hydrosulfite vat, which is formed easily and quickly even at ordinary temperature, reddish yellow tints. The dyestuff most probably corresponds with the following formula:

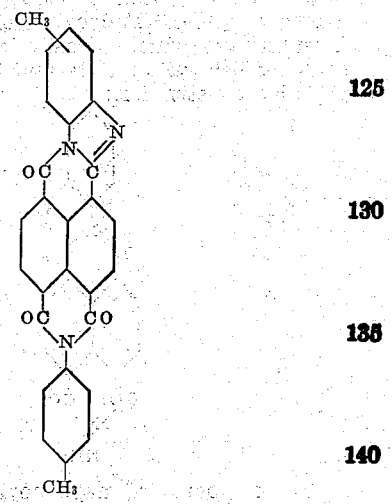

(9) 1 part of naphthoylene-benzimidazol-peri-dicarboxylic acid anhydride is mixed with 5 parts of beta-hydroxy-ethylamine and the mixture is slowly heated. Temporarily the anhydride dissolves, but subsequently the mixture solidifies on further heating with elimination of small microcrystalline needles. After the reaction is complete, the whole is diluted with water, filtered with suction, the solid matter is washed with water and dried. The reaction product which probably is the beta-hydroxy-ethylimide of the naphthoylene-benzimidazol-peri-dicarboxylic acid and corresponds with the following formula:

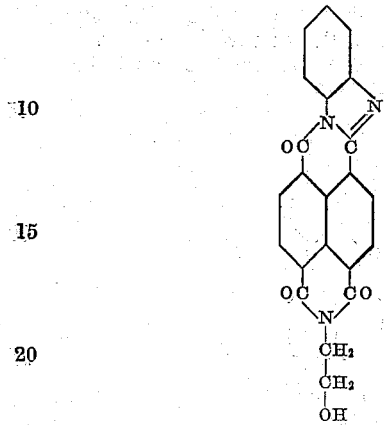

forms an orange crystalline powder; it dissolves in concentrated sulfuric acid to a yellow solution and dyes cotton from a red hydrosulfite vat yellowish tints.

(10) By using in Example 9 instead of the naphthoylene - benzimidazol - peri - dicarboxylic acid anhydride the corresponding quantity of naphthoylene-methyl-benzimidazol-peri - dicarboxylic acid anhydride, there is obtained a dyestuff of very similar properties which dyes cotton reddish yellow tints.

(11) 3.4 parts of naphthoylene-benzimidazol-peri-dicarboxylic acid anhydride and 15 parts of hydrazine hydrate are warmed together. The anhydride gradually dissolves whereby the solution slowly becomes dark red. When the solution has assumed its reddish coloration, it is diluted with water whereby a clear red solution of the leuco compound of the condensation product, formed by the reducing action of the hydrazine, is obtained. By blowing a current of air through the solution an orange precipitate is obtained. It is filtered with suction, washed with water and may be directly used, in the form of a paste, for dyeing purposes. It dyes cotton from a red hydrosulfite vat, which is easily formed even in the cold, reddish yellow tints and has the following probable constitution:

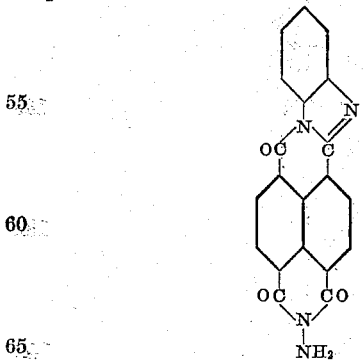

(12) 4.1 parts of naphthoylene-4.5-dichloro-benzimidazol-peri-dicarboxylic acid or the corresponding quantity of the anhydride thereof are heated to gentle boiling for some hours with 5-6 times their weight of cyclohexylamine. After cooling, the solution is filtered with suction, the solid matter is washed with cyclohexylamine and hot water. The dyestuff is a yellow powder and dyes cotton from a green weakly alkaline hydrosulfite vat yellow tints of good fastness properties. The dyestuff corresponds with the following probable formula:

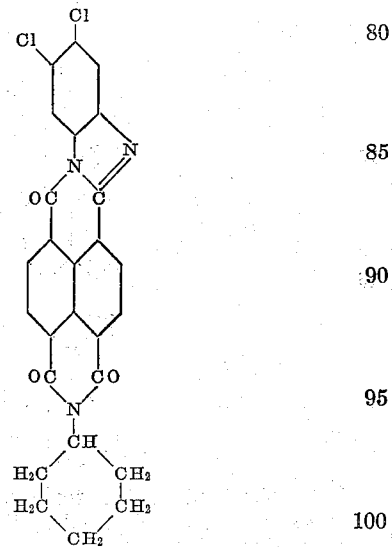

(13) By using instead of the naphthoylene-4.5-dichlorobenzimidazol-peri-dicarboxylic acid the corresponding quantity of naphthoylene-chloro - bromo - benzimidazol-peri - dicarboxylic acid a dyestuff is obtained which hardly differs in its properties from those of the dyestuff obtainable according to Example 12.

(14) By causing naphthoylene-dichloro-benzimidazol-peri-dicarboxylic acid anhydride—obtainable, for instance, by condensing acenaphthene-4.5-dicarboxylic acid with 3.5-dichloro-1.2-diaminobenzene and oxidizing the benzimidazol derivative thus obtained—to react with cyclohexylamine a dyestuff is obtained which dyes cotton from a feebly alkaline hydrosulfite vat clear reddish yellow tints of good fastness properties.

(15) By condensing acenaphthalic acid with 3.5-dibromo-1.2-diaminobenzene and oxidizing this condensation product, naphthoylene-dibromo-benzimidazol-peri-dicarboxylic acid is obtained which on reaction with cyclohexylamine yields a yellow dyestuff of properties very similar to those of the dyestuff described in Example 14.

(16) 4 parts of naphthoylene-benzimidazol-peri-dicarboxylic acid anhydride and 10 parts of benzylamine are heated together to about 150° C.-160° C. for some hours. The dyestuff which probably has the constitution of a benzylimide of naphthoylene - benzimidazol - peri - dicarboxylic acid

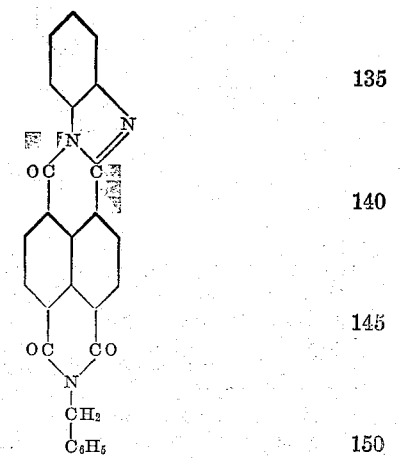

thereby precipitates in the form of reddish yellow crystals. After cooling, it is filtered with suction, washed with alcohol and hot water and dried. It forms a reddish yellow powder and dyes cotton from a red feebly alkaline hydrosulfite vat clear redish yellow tints.

(17) 10 parts of 1·4·5·8-naphthalene-tetra-carboxylic acid monophenylimide are heated to boiling for about half an hour with 4 parts of ortho-pheylenediamine in 100 parts by volume of glacial acetic acid. After cooling, the dyestuff which has been formed, is filtered with suction, washed with water and dried. It crystallizes in the form of yellow laminæ and dissolves in concentrated sulfuric acid to a yellow solution. It dyes the vegetable fiber from a red vat reddish yellow tints and has the following constitution:

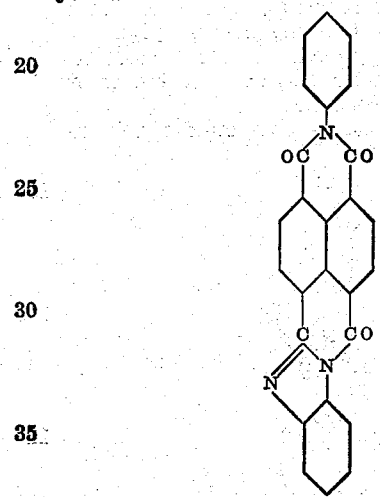

(18) By using in Example 17 instead of ortho-phenylene-diamine ortho nitraniline and heating to gentle boiling for some time 10 parts of the condensation product in about 200 parts by volume of glacial acetic acid in the presence of an excess of pulverized iron, a dyestuff of the same constitution as described in Example 17 separates.

(19) 20 parts of 1·4·5·8-naphthalene-tetra-carboxylic acid mono-beta-naphthylamide of the following formula:

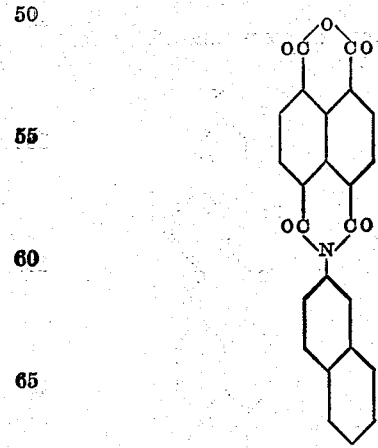

are molten with an excess of ortho-phenylenediamine and heated for a short time to 150° C.-200° C. After diluting the melt with, for instance, methyl- or ethyl-alcohol the dyestuff is filtered with suction, washed with alcohol and dried. It has the same constitution as the dyestuff obtained according to Example 2.

(20) By using in Example 17 instead of ortho-phenylenediamine, 4-methyl-1.2-diaminobenzene and proceeding as indicated in that example, a dyestuff of the following constitution:

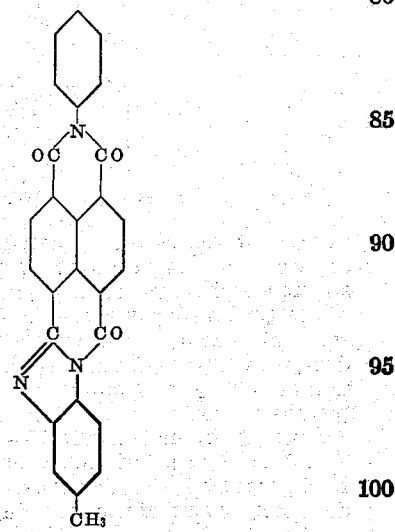

is obtained having properties similar to those of the product of Example 17.

We claim:
1. The process which comprises condensing a compound of the following general formula

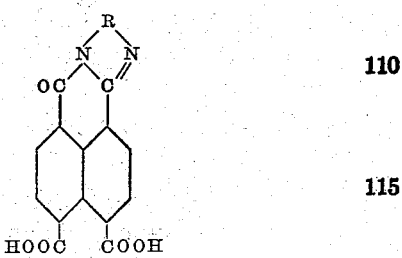

wherein R represents an arylene of the group consisting of phenylene, methylphenylene, halogenphenylene and naphthylene, bound in two adjacent positions, with a compound of the general formula X—NH₂ wherein X represents a radical of the group consisting of hydrogen, hydroxyethyl, phenyl, halogenphenyl, methylphenyl, naphthyl, cyclohexyl, amino and phenylimino, by heating the compounds in the presence of an inert diluent.

2. The process which comprises condensing a compound of the following general formula

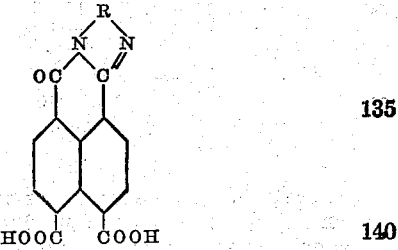

wherein R represents an arylene of the group consisting of phenylene, methylphenylene, halogenphenylene and naphthylene, bound in two adjacent positions, with a compound of the general formula X—NH₂ wherein X represents a radical of the group consisting of hydroxyethyl, phenyl, halogenphenyl, methylphenyl, cyclohexyl and amino, by heating the compounds in the presence of an inert diluent.

3. The process which comprises condensing a compound of the following general formula

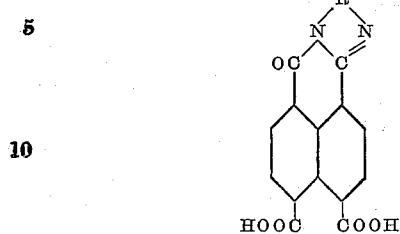

wherein R represents a phenylene group, bound in two adjacent positions, which may be substituted by halogen or methyl with a compound of the general formula X—NH$_2$ wherein X represents a radical of the group consisting of hydroxyethyl, phenyl, halogenphenyl, methylphenyl, cyclohexyl and amino, by heating the compounds in the presence of an excess of the said compound of the formula X—NH$_2$.

4. The process which comprises condensing naphthoylene - 4.5 - dichloro-benzimidazol-peri-dicarboxylic acid of the following formula

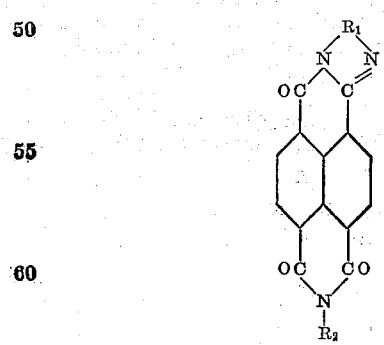

with cyclohexylamine by heating the compounds in the presence of an excess of boiling cyclohexylamine.

5. As new products, the compounds of the following general formula:

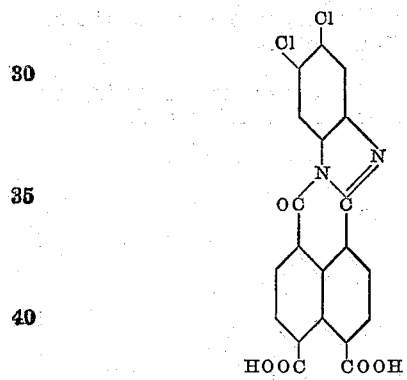

wherein R$_1$ represents an arylene of the group consisting of phenylene, methylphenylene, halogenphenylene and naphthylene, bound in two adjacent positions, and R$_2$ represents a radical of the group consisting of hydrogen, hydroxyethyl, phenyl, halogenphenyl, methylphenyl, naphthyl, cyclohexyl, amino and phenylimino, said compounds representing useful vat dyestuffs of clear tints, strong coloring power and good fastness properties.

6. As new products, the compounds of the following general formula

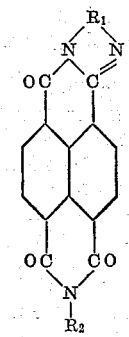

wherein R$_1$ represents a phenylene group, bound in two adjacent positions, which may be substituted by halogen or methyl and R$_2$ represents a radical of the group consisting of hydroxyethyl, phenyl, halogenphenyl, methylphenyl, cyclohexyl and amino said compounds representing useful vat dyestuffs of clear tints, strong coloring power and good fastness properties.

7. As a new product, the compound of the following formula

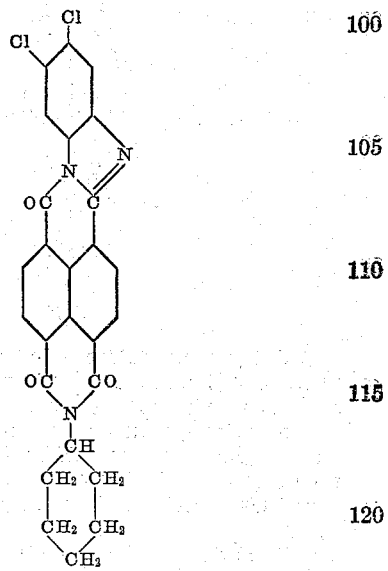

being a yellow powder and dyeing cotton from a green feebly alkaline hydrosulfite vat yellow tints of good fastness properties.

8. As a new product, the compound of the following probable formula

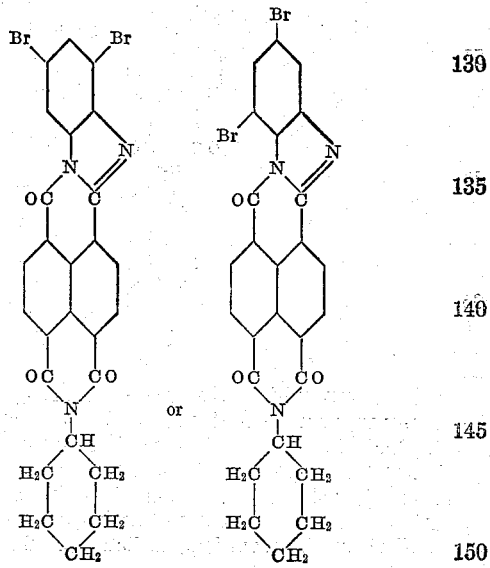

being a yellow and powder and dyeing cotton from a feebly alkaline hydrosulfite vat clear reddish-yellow tints of good fastness properties.

9. As a new product, the compound of the following probable formula

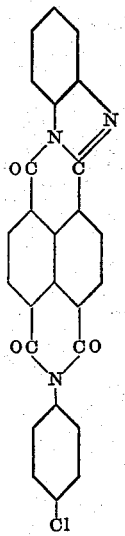

forming reddish prismatic crystals which do not change when heated to 370° C., dissolving in sulfuric acid to a yellow solution and dyeing cotton from a red hydrosulfite vat yellow tints.

WILHELM ECKERT.
OTTO BRAUNSDORF.